United States Patent
Lan et al.

(10) Patent No.: US 11,218,286 B2
(45) Date of Patent: *Jan. 4, 2022

(54) REDUCING INTERMODULATION DISTORTION FOR INTRA-BAND DUAL CONNECTIVITY

(71) Applicant: T-Mobile USA, Inc., Bellevue, WA (US)

(72) Inventors: Wei-Ming Lan, Morrisville, NC (US); Ming Shan Kwok, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 86 days.

This patent is subject to a terminal disclaimer.

(21) Appl. No.: 16/675,814

(22) Filed: Nov. 6, 2019

(65) Prior Publication Data

US 2020/0076565 A1  Mar. 5, 2020

Related U.S. Application Data

(63) Continuation of application No. 16/034,241, filed on Jul. 12, 2018, now Pat. No. 10,505,700.

(51) Int. Cl.
*H04L 12/50* (2006.01)
*H04L 5/06* (2006.01)
*H04W 88/06* (2009.01)
*H04W 84/04* (2009.01)

(52) U.S. Cl.
CPC .............. *H04L 5/06* (2013.01); *H04W 84/042* (2013.01); *H04W 88/06* (2013.01)

(58) Field of Classification Search
CPC ........................................................ H04L 12/28

USPC ......................................................... 370/329
See application file for complete search history.

(56) References Cited

U.S. PATENT DOCUMENTS

| | | |
|---|---|---|
| 6,518,856 B1 | 2/2003 | Casale et al. |
| 10,313,000 B2 | 6/2019 | Buer et al. |
| 2003/0001668 A1 | 1/2003 | Mruz et al. |
| 2010/0277253 A1 | 11/2010 | Mui |
| 2014/0232483 A1 | 8/2014 | Correa et al. |

(Continued)

OTHER PUBLICATIONS

PCT Search Report and Written Opinion dated Sep. 27, 2019 for PCT Application No. PCT/US2019/036279, 12 pages.

*Primary Examiner* — Dang T Ton
(74) *Attorney, Agent, or Firm* — Lee & Hayes, P.C.

(57) ABSTRACT

A radio frequency front end (RFFE) is configured to support dual connectivity communications, in which two different radio access technologies such as $4^{th}$-Generation (4G) Long-Term Evolution (LTE) and $5^{th}$-Generation (5G) New Radio (NR) data connections are used simultaneously for communications between a wireless communication device and respective LTE and NR base stations. In described embodiments, the RFFE uses two power amplifiers to reduce intermodulation distortion (IMD). The two power amplifiers produce output signals for a 4G LTE uplink and a 5G NR uplink, respectively. The RFFE also has a combiner that mixes the output signals to produce a composite output signal representing both LTE and NR data. Bypass switches may be used to configure the RFFE so that it can be used for single conventional 4G LTE communications.

20 Claims, 7 Drawing Sheets

(56) References Cited

U.S. PATENT DOCUMENTS

2015/0009889 A1    1/2015  Zhan
2020/0267711 A1*   8/2020  Josan ................... H04W 24/08

* cited by examiner

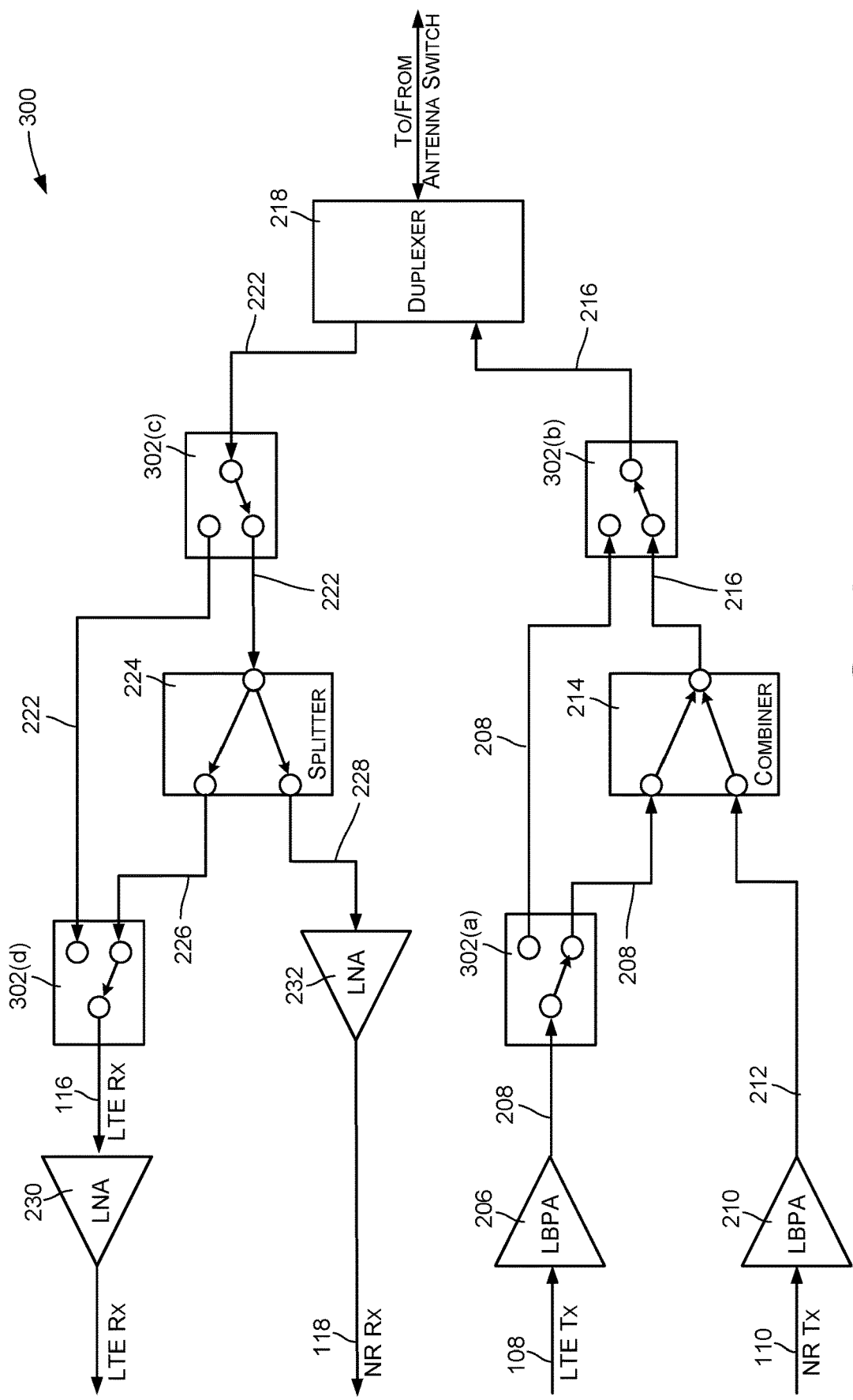

REDUCING INTERMODULATION DISTORTION FOR INTRA-BAND DUAL CONNECTIVITY

CROSS REFERENCE TO RELATED APPLICATIONS

The present disclosure is a continuation of, and claims priority under 35 U.S.C. § 120 to, U.S. patent application Ser. No. 16/034,241, filed Jul. 12, 2018, the entire disclosure of which is hereby incorporated by reference in its entirety.

BACKGROUND

Cellular communication devices use various network radio access technologies to communicate wirelessly with geographically distributed base stations. Long-Term Evolution (LTE) is an example of a widely implemented radio access technology used in $4^{th}$-Generation (4G) communication systems. New Radio (NR) is a newer radio access technology that is used in $5^{th}$-Generation (5G) communication systems. Standards for LTE and NR radio access technologies have been developed by the 3rd Generation Partnership Project (3GPP) for use by wireless communication carriers within cellular communication networks.

A communication protocol defined by the 3GPP, referred to as Non-Standalone (NSA), specifies the simultaneous use of LTE and NR for communications between a mobile device and a communication network. Specifically, NSA uses Dual Connectivity (DC), in which a user equipment (UE) uses both LTE and NR carriers for uplink communications with corresponding 4G and 5G base stations. LTE carriers are used for control-plane messaging and for user-plane communications. NR carrier are used for additional user-plane bandwidth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A and 3B are block diagrams showing the RFFE of FIG. 3 with the addition of bypass switches

DETAILED DESCRIPTION

Described herein are components and techniques for processing dual-connectivity radio frequency (RF) signals, such as RF signals that might be used for operating in a Non-Standalone mode, where communications use both 4G and 5G radio access technologies. The components and techniques may be used by or within a wireless telecommunication device, for example.

In a described embodiment, uplink data is transmitted using both $4^{th}$-Generation (4G) radio access technology and $5^{th}$-Generation 5G radio access technology. Long-Term Evolution (LTE) is an example of 4G radio access technology. New Radio (NR) is an example of 5G radio access technology.

The telecommunication device has a radio frequency front end (RFFE) that supports simultaneous LTE and NR communications. However, dual connectivity such as this can produce significant intermodulation distortion (IMD), and attempting to mitigate IMD might in some cases involve dramatically reducing transmit power, resulting in decreased network coverage. IMD can be especially significant when LTE and NR carriers are near each other in frequency, such as being within the same frequency band. This might happen for example, when LTE and NR uplinks are both within the 600 MHz band as is the case for B71+N71 5G Dual Connectivity. B71 refers to LTE frequencies within the 600 MHz band. N71 refers to NR frequencies in the 600 MHz band.

Although two antennas might theoretically be used to reduce IMD, modern smartphones are often too small to accommodate two low-band antennas of sufficient gain. Although some smartphones may have a second antenna that is used for diversity signal reception, the second antenna typically has significantly less gain than the primary antenna and its use for dual-connectivity transmission would therefore be relatively ineffective.

In accordance with embodiments described herein, an RFFE such as used in a cellular communication device has two power amplifiers, which produce output signals for a 4G LTE uplink and a 5G NR uplink, respectively. The amplified output signals are combined, resulting in a composite output signal representing both LTE and NR data. The composite output signal is connected to an antenna of the device for transmission.

Combining the signals after separate amplification in this manner reduces IMD issues, even when using a single antenna. The described configurations may also reduce Maximum Power Reduction (MPR) and Additional MPR (A-MPR) in certain situations.

Although the techniques are discussed in the context of LTE and NR radio access technologies, the techniques described herein may also be used with different network types, standards, frequencies, and technologies. The techniques may generally be used for various types of carrier aggregation (CA), in which data represented by multiple RF carriers is aggregated to form a single data stream. For example, certain 4G/LTE systems may use carrier aggregation and may benefit from the disclosed techniques.

Figure 1:
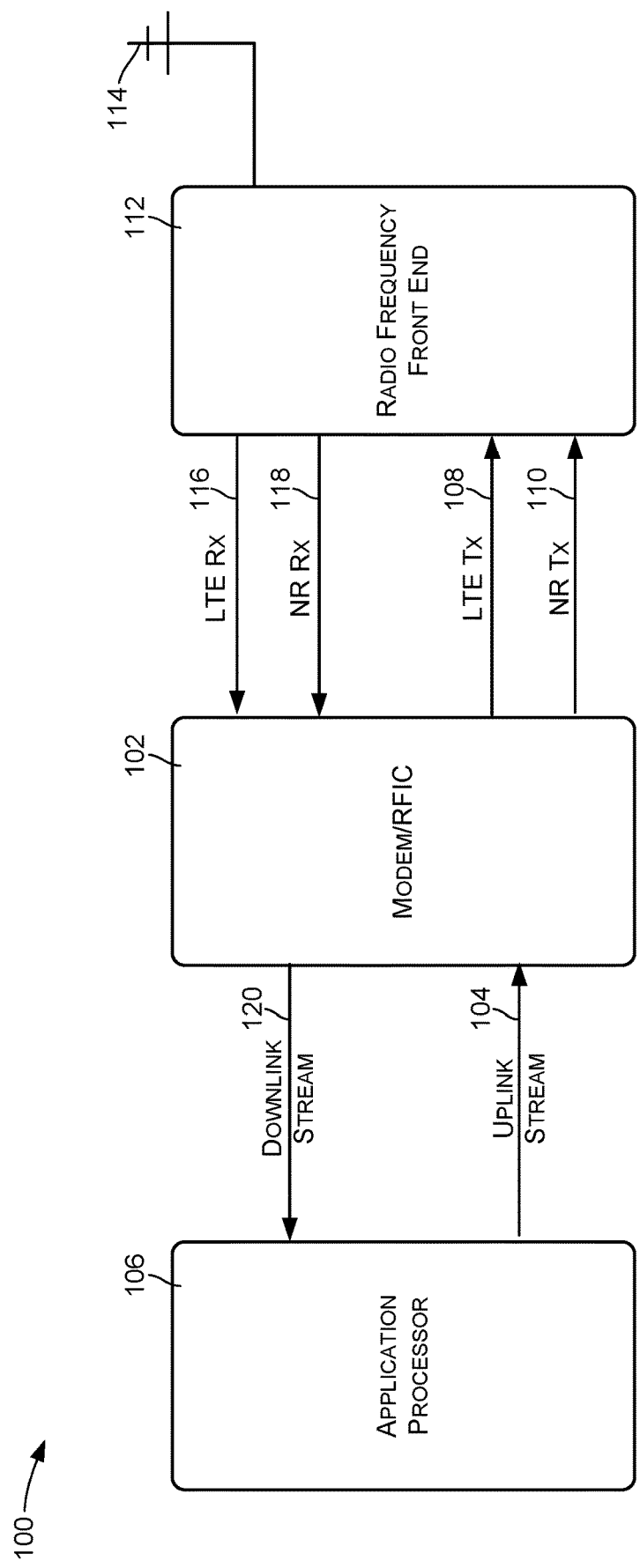
FIG. 1 is a block diagram of a portion of a wireless communication device that implements dual connectivity using 4G and 5G air interfaces.

FIG. 1 illustrates relevant components of a cellular communication device 100 for use in a wireless communication network, such as in a cellular communication network. The cellular communication device 100 may comprise a mobile device such as a smartphone or other telephonic handset, a tablet computer, a laptop computer, a monitoring device, etc. Alternatively, the cellular communication device 100 may comprise another type of device, such as a controller, an Internet-of-Things (IoT) device, a home automation component, a wireless access point or hotspot, etc. In some cases, the cellular communication device 100 may be referred to as a user equipment (UE) or mobile station (MS).

The cellular communication device 100 may be configured to communicate with the wireless communication network using both 4G and 5G radio access technologies. For 4G, the cellular communication device 100 supports LTE communications. For 5G, the cellular communication device 100 supports NR communications. In some implementations, the cellular communication device 100 may support other communication, including but not limited to, 2G, 3G/EDGE, Wi-Fi, Bluetooth, etc.

The components shown in FIG. 1 may be used to implement Dual-Connectivity, for use in a Non-Standalone (NSA) configuration. When using NSA, the cellular communication device 100 simultaneously establishes an LTE carrier and an NR carrier with respective LTE and NR base stations. The LTE carrier is used for control-plane messaging and for user-plane communications. The NR carrier is used for additional user-plane bandwidth. Dual connectivity such as this may also be used for certain types of carrier aggregation such as may be used in LTE or other cellular communication systems.

For purposes of discussion, a 4G or LTE component is a component that performs according to the 4G or LTE communications standard. A 4G or LTE signal or communication is a signal or communication that accords with the 4G or LTE communications standard. A 5G or NR component is a component that performs according to the 5G or NR communications standard. A 5G or NR signal or communication is a signal or communication that accords with the 5G or NR communications standard.

The cellular communication device 100 has an internal modem and radio-frequency integrated circuit (RFIC), components that are collectively referred to as a Modem/RFIC 102, that receive an uplink data stream 104 from an application processor 106. The modem processes baseband signals, and the RFIC converts the baseband signals to RF frequencies.

The uplink data stream 104 is a digital data stream containing data that is to be transmitted wirelessly to a cellular communication network using NSA dual connectivity. The modem/RFIC 102 produces LTE and NR Tx signals 108 and 110, each of which represents a portion of the uplink data stream 104.

The LTE Tx signal 108 may also be referred to as an LTE RF output signal, and represents a first portion of the uplink data stream 104 in accordance with the LTE radio access technology. The NR Tx signal 110 may also be referred to as an NR RF output signal, and represents a second portion of the uplink data stream 104 in accordance with NR radio access technology. For purposes of discussion, the portion of the uplink data stream 104 that is to be transmitted using LTE radio access technology will be referred to as LTE data. The portion of the uplink data stream 104 that is to be transmitted using NR radio access technology will be referred to as NR data.

The cellular communication device 100 has an RF front end (RFFE) 112 that performs amplification and filtering of analog RF input and output signals, including the LTE Tx signal 108 and the NR Tx signal 110. In the illustrated embodiment, the LTE Tx signal 108 and NR Tx signal 110 are provided concurrently by the modem/RFID 102 to the RFFE 112, for concurrent transmission by the RFFE 112.

The RFFE 112 transmits and receives using a single antenna 114. The cellular communication device 100 may in some cases use one or more different or additional antennas for receiving RF signals.

The RFFE 112 is also configured for simultaneous reception of LTE and NR signals. An LTE Rx signal 116 and an NR Rx signal 118 are provided concurrently by the RFFE 112 to the modem/RFIC 102. The LTE Rx signal 116 may also be referred to as an LTE RF input signal. The NR Rx signal 118 may also be referred to as an NR RF input signal. The LTE Rx signal 116 represents data that is being received using LTE radio access technology. The NR Rx signal 118 represents data that is being received using NR radio access technology.

The modem/RFIC 102 converts the RF LTE Rx signal 116 and the RF NR Rx signal 118 to corresponding digital streams, and combines or aggregates the digital streams to produce an aggregated downlink data stream 120 that is provided to the application processor 106.

The illustrated components of the cellular communication device 100 may in some embodiments be implemented by a chipset or system-on-chip (SOC), which may comprise one or more integrated circuits. Components such as the application processor, the modem, the RFIC, the RFFE, and other components may be distributed or arranged in various ways among integrated circuits of the chipset.

Figure 2:
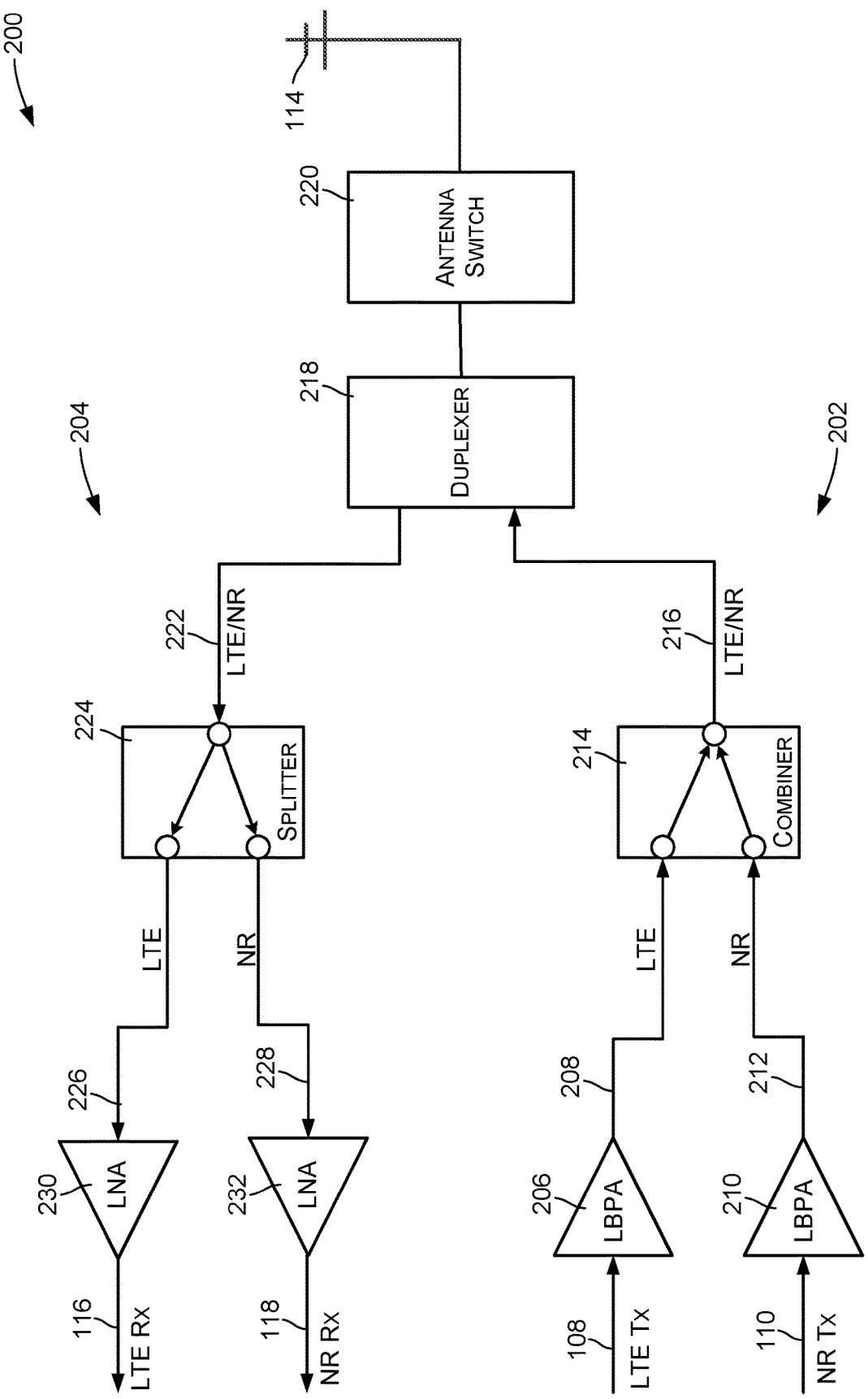
FIG. 2 is a block diagram of an example radio frequency front end (RFFE) that may be used in the device shown in FIG. 1.

FIG. 2 shows an example implementation of an RFFE 200, which may be used as the RFFE 112 of FIG. 1. The RFFE 200 may be used within a cellular or other wireless communication device for simultaneous LTE and NR communications and/or for other types of carrier aggregation or dual connectivity. In certain embodiments, the RFFE 200 may be used to support dual connectivity for non-standalone (NSA) mode in accordance with 3GPP 5G specifications, particularly when LTE and NR signals have frequencies that vary from each other by only a small amount.

Figure 3B:
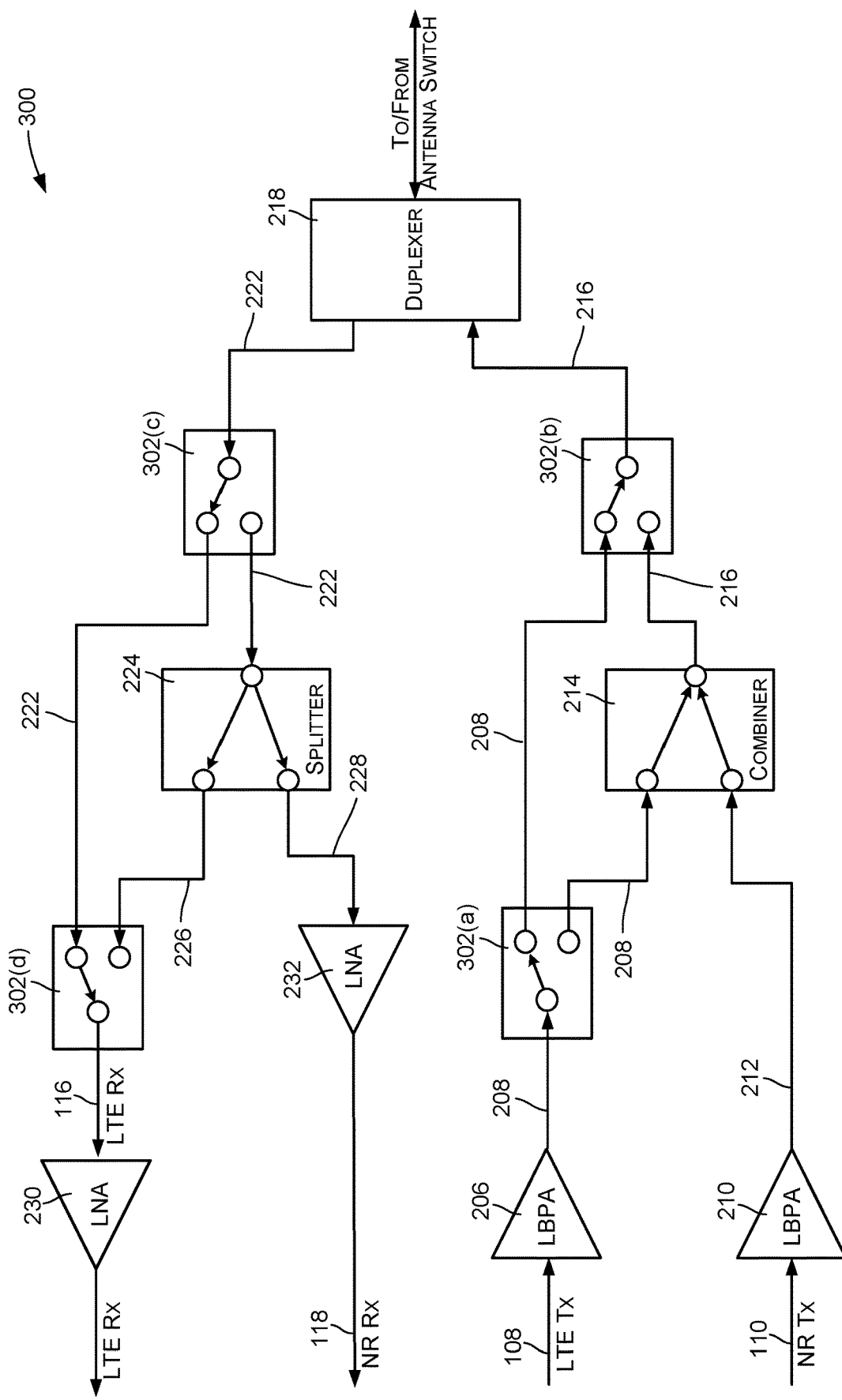
Figure 4:
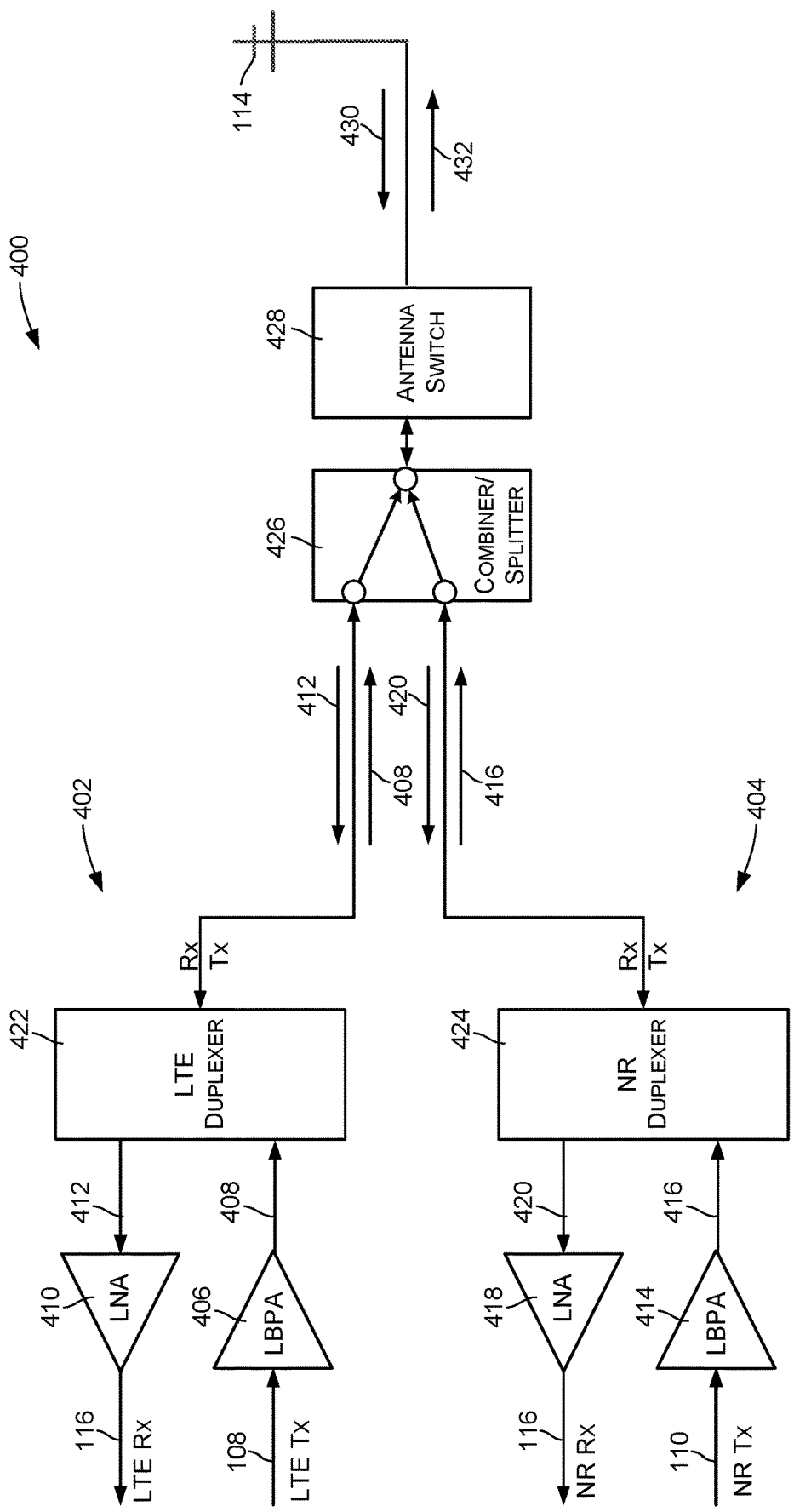
FIG. 4 is a block diagram of another example RFFE that may be used in the device shown in FIG. 1.

All signals of FIG. 2, as well as the signals of FIGS. 3A, 3B, and 4, are radio frequency (RF) signals. In some embodiments, LTE and NR signal frequencies may be within the same frequency band or may otherwise have frequencies that differ by a relatively small amount. For example, LTE and NR signal frequencies may be within a band of frequencies that are designated or regulated for cellular device communications, such as the 600 MHz frequency band. In these cases, the LTE and NR signal frequencies may be adjacent to each other (i.e. there is no separation between LTE and NR signal frequencies).

The RFFE 200 has a transmit section 202 and a receive section 204. The transmit section 202 has a first low-band power amplifier (LBPA) 206 that receives and amplifies the LTE Tx signal 108, also referred to herein as an LTE RF output signal, to produce an amplified LTE RF output signal 208. The transmit section 202 has a second LBPA 210 that receives and amplifies the NR Tx signal 110, also referred to herein as an NR RF output signal, to produce an amplified NR RF output signal 212.

The amplified LTE RF output signal 208 and the amplified NR RF output signal 212 are received by an RF signal combiner 214, which mixes the amplified LTE and NR RF output signals 208 and 212 to create a composite RF output signal 216. The combiner 214 may be implemented as a linear component, and therefore introduces little intermodulation distortion (IMD).

The composite RF output signal 216 is received by an RF duplexer 218, which connects the composite RF output signal 216 through an antenna switch 220 for transmission from the antenna 114. The RF duplexer 218 may have filters for various frequencies or frequency bands that are supported by the RFFE 200, including both transmit and receive filters.

In some embodiments, an antenna tuner may also be used between the duplexer 218 and the antenna 114.

The filter bank 220 and duplexer 118 produce a composite RF input signal 222 based on RF signals received at the antenna 114. The duplexer 218 connects the composite RF input signal 222 to a signal splitter 224. The splitter 224 processes the composite RF input signal 222 to produce an LTE RF input signal 226 and an NR RF input signal 228. More specifically, the splitter 224 applies appropriate filters to the composite RF input signal to create the LTE RF input signal 226 and the NR RF input signal 228.

A first low-noise amplifier (LNA) 230, referred to herein as an LTE LNA 230, amplifies the LTE RF input signal 226 to create the LTE Rx signal 116. A second LNA 232, referred to herein as an NR LNA 232, amplifies the NR RF input signal 228 to create the NR Rx signal 118. An LNA is an amplifier that amplifies a low-power RF signal without significantly decreasing its signal-to-noise ratio.

The LTE Rx signal 116 represents data that is received in accordance with LTE radio access technology. The NR Rx signal 118 represents data that is received in accordance with NR radio access technology.

Note that FIG. 2 shows components that are most relevant to the topics discussed herein. In implementation, the RFFE 200 may have additional components and may be configured in different ways.

FIGS. 3A and 3B show another example of the RFFE 200. This example is similar to the example of FIG. 2, except that RF switches 302 have been added to allow reconfiguration of the RFFE 200 for non-dual connectivity operation. Specifically, the RF switches 302 include first and second RF switches 302(a) and 302(b) that can be used to selectively bypass the signal combiner 214 and to provide the amplified LTE RF output signal 208 directly to the duplexer 218, rather than the composite RF output signal 216, for transmission by the antenna. The RF switches 302 further include third and fourth RF switches 302(c) and 302(d) that can be used to selectively bypass the splitter 224 and to provide the composite RF input signal 222 directly to the first LNA 230. FIG. 3A shows the switches set to positions for use with NSA communications. FIG. 3B shows the switches set to positions for LTE, non-NSA communications.

FIG. 4 shows another example implementation of an RFFE 400, which may be used as the RFFE 112 of FIG. 1. The RFFE 400 may be used within a cellular or other wireless communication device for simultaneous LTE and NR communications and/or for other types of carrier aggregation or dual connectivity. In certain embodiments, the RFFE 400 may be used to support dual connectivity for NSA mode in accordance with 3GPP 5G specifications, particularly when LTE and NR signals have frequencies that are within the same frequency band and/or that vary from each other only by a small amount.

The RFFE 400 has an LTE section 402 and an NR section 404. The LTE section 402 has a first low-band power amplifier (LBPA) 406 that receives and amplifies the LTE Tx signal 108 to produce an amplified LTE RF output signal 408. The LTE section 402 also has a first LNA 410, referred to herein as an LTE LNA 410, that receives and amplifies an LTE RF input signal 412 to create the LTE Rx signal 116.

The NR section 404 has a second LBPA 414 that receives and amplifies the NR Tx signal 110 to produce an amplified NR RF output signal 416. The NR section 404 also has a second LNA 418, referred to herein as an NR LNA 418, that receives and amplifies an NR RF input signal 420 to create the NR Rx signal 118.

In the LTE section 402, an LTE duplexer 422 receives the amplified LTE RF output signal 408 from the LTE LBPA 406 and provides the LTE RF input signal 412 to the LTE LNA 410. In the NR section 404, an NR duplexer 424 receives the amplified NR RF output signal 416 from the NR LBPA 414 and provides the NR RF input signal 420 to the NR LNA 418.

The RFFE 400 has a signal combiner/splitter 426 that provides signals to and receives signals from the antenna 114 through an antenna switch 428.

In operation, the combiner/splitter 426 receives an antenna input signal 430 from the antenna 114 and splits the antenna input signal 430 to produce the LTE RF input signal 412 and the NR RF input signal 420, using appropriately selected frequency filters. The LTE duplexer 422 is connected to receive the LTE RF input signal 412 and to provide it to the LTE LNA 410. The NR duplexer 424 is connected to receive the NR RF input signal 420 and to provide it to the NR LNA 418.

The LTE duplexer 422 receives the amplified LTE RF output signal 408 and provides it to the combiner/splitter 426. The NR duplexer 424 receives the amplified NR RF output signal 416 and provides it to the combiner/splitter 426. The combiner/splitter 426 mixes the amplified LTE RF output signal 408 and the amplified NR RF output signal 416 to create a composite RF antenna output signal 432 for transmission by the antenna 114.

The combiner/splitter 426 may include multiple filters and associated switches so that appropriate filters can be selected and used with different signal frequencies.

The RFFE 400 may have better RF performance than the RFFE 204 of FIG. 2, at the expense of a higher number of components and additional physical space.

Figure 5:
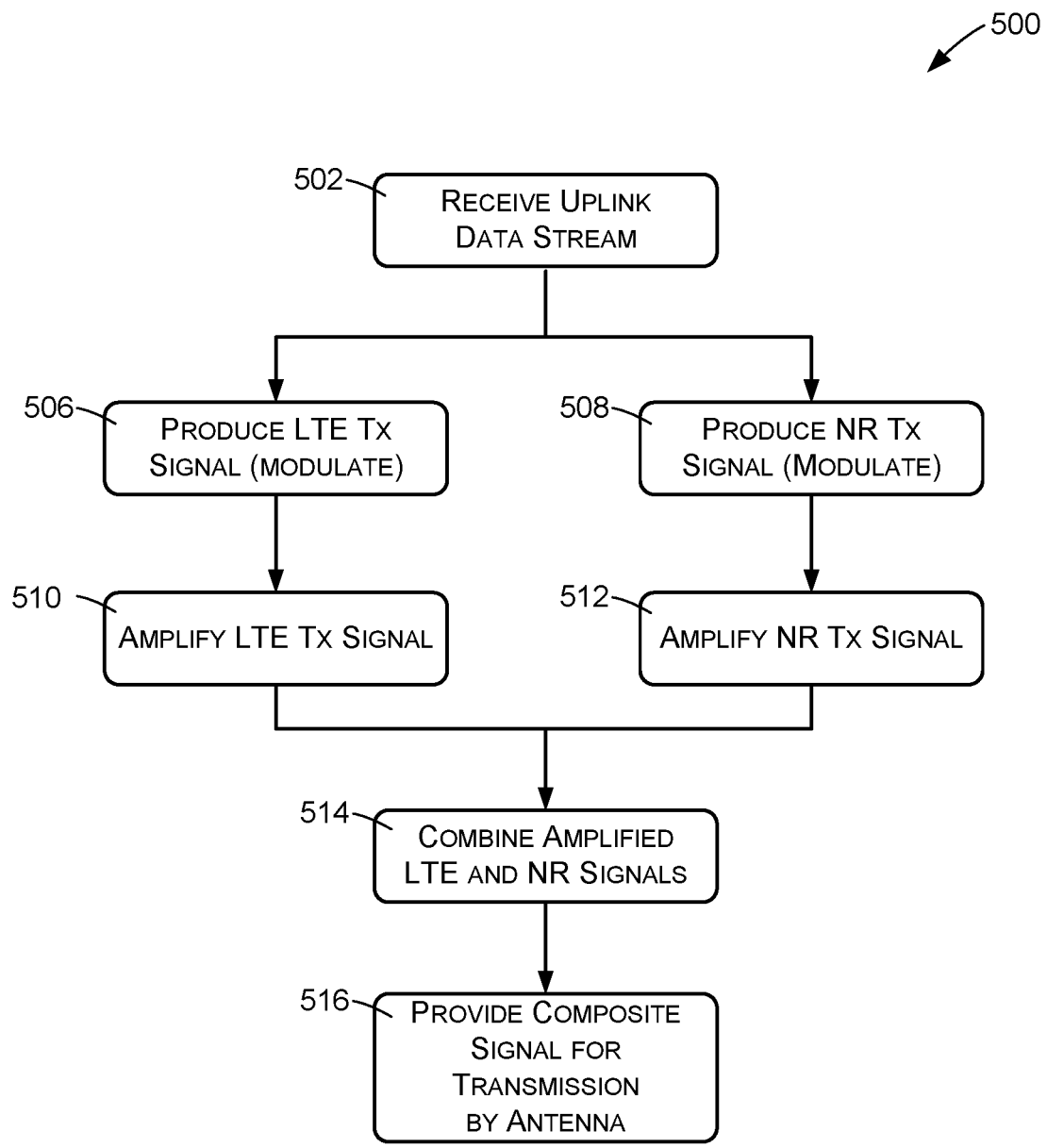
FIG. 5 is a flow diagram illustrating an example method of transmitting data signals using dual connectivity.

FIG. 5 illustrates an example method 500 of transmitting dual-connectivity uplink data. The example method 500 may be performed by a cellular communication device such as a smartphone, and more specifically by device components such as the modem/RFIC 102 and the RFFE 112 of FIG. 1.

An action 502, which may be performed by a modem or other processing component, comprises receiving an uplink data stream that is to be transmitted by the cellular communication device to one or more wireless base stations. The uplink data stream may contain uplink data that is to be transmitted using both LTE and NR radio access technologies.

An action 506, performed by the modem or other processing component, comprises producing an LTE RF output signal representing a portion of the uplink data that is referred to as the LTE data stream. The action 506 may, for example, comprise modulating a first signal to represent the LTE data stream in accordance with LTE radio access technology.

An action 508, which may be performed concurrently with the action 506, comprises producing an NR RF output signal representing another portion of the uplink data that is referred to as the NR data stream. The action 508 may, for example, comprise modulating a second signal to represent the NR data stream in accordance with NR radio access technology.

In some cases, the LTE and NR RF output signals may have corresponding frequencies that are within a band of frequencies that are designated for cellular device communications, such as the 600 MHz B71 and N71 bands.

An action 510, which may be performed by the RFFE, may comprise amplifying the LTE RF output signal to produce an amplified LTE RF output signal. An action 512, which may be performed by the RFFE 112 concurrently with the action 510, may comprise amplifying the NR RF output signal to produce an amplified NR RF output signal.

An action 514, which may be performed by a signal combiner of an RFFE, may comprise combining the amplified LTE and NR RF output signals to create a composite RF output signal.

An action 516 comprises providing the composite RF output signal for transmission by an antenna of the cellular communication device.

Figure 6:
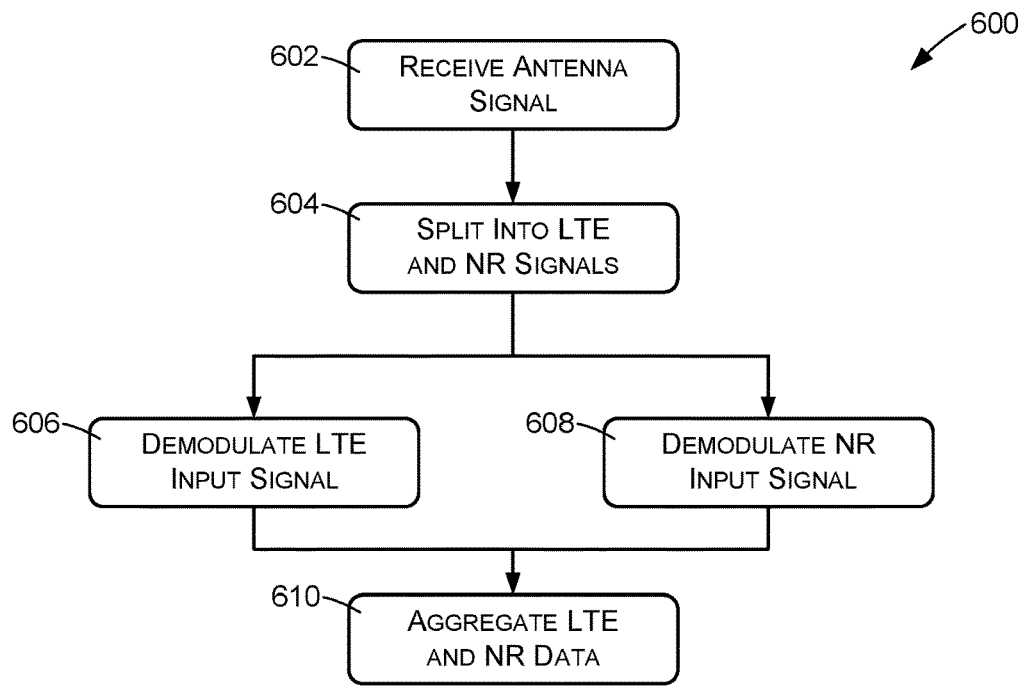
FIG. 6 is a flow diagram illustrating an example method of receiving data signals using dual connectivity.

FIG. 6 illustrates an example method 600 of processing dual-connectivity downlink signals. The example method 600 may be performed by components such as the modem/RFIC 102 and the RFFE 112 of FIG. 1.

An action 602, performed by the RFFE, comprises receiving an antenna signal from one or more antennas of a cellular communication device. The received antenna signal represents first downlink data in accordance with LTE radio access technology and second downlink data in accordance with NR radio access technology. For example, the received signal may comprise a composite signal containing both LTE and NR signals.

An action 604 comprises splitting the received antenna signal into an LTE RF input signal that represents LTE downlink data and an NR RF input signal that represents NR downlink data. The action 604 may be accomplished by selecting and using appropriate frequency filters, corresponding respectively to the frequency of the LTE RF input signal and the frequency of the NR RF input signal.

An action 606, which may be performed by a modem or other processing component of the cellular communication device, may comprise demodulating the LTE RF input signal to produce LTE downlink data. An action 608, which may be performed concurrently with the action 606, may comprise demodulating the NR RF input signal to produce NR downlink data.

An action 610, which may be performed by the modem or other processing component of the cellular communication device, may comprise aggregating the LTE and NR downlink data to produce a downlink data stream.

Figure 7:
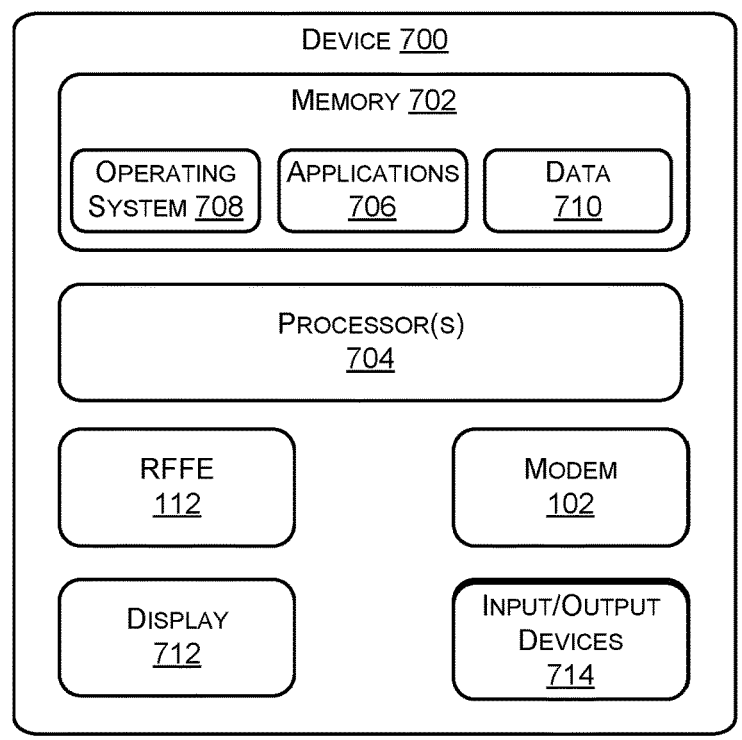
FIG. 7 is a block diagram of an example mobile communication device.

FIG. 7 illustrates an example mobile communication device 700 that may be used to implement the techniques described herein. The method 500 of FIG. 5 and the method 600 of FIG. 6, for example, may be implemented by a device such as the device 700. The components shown in FIGS. 1, 2, 3A, 3B, and/or 4 may be implemented within a device such as the device 700.

FIG. 7 shows only basic, high-level components of the device 700. Generally, the communication device 700 may comprise any of various types of cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 700 may be referred to as a user equipment (UE) or mobile station (MS).

The device 700 may include memory 702 and a processor 704. The memory 702 may include both volatile memory and non-volatile memory. The memory 702 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 702 may include a SIM (subscriber identity module), which is a removable smart card used to identify a user of the device 700 to a service provider network.

The memory 702 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 702 may in some cases include storage media used to transfer or distribute instructions, applications, and/or data. In some cases, the memory 702 may include data storage that is accessed remotely, such as network-attached storage that the device 700 accesses over some type of data communication network.

The memory 702 stores one or more sets of computer-executable instructions (e.g., software) such as programs that embody operating logic for implementing and/or performing desired functionality of the device 700. The instructions may also reside at least partially within the processor 704 during execution thereof by the device 700. Generally, the instructions stored in the computer-readable storage media may include various applications 706 that are executed by the processor 704, an operating system (OS) 708 that is also executed by the processor 704, and data 710 associated with the applications 706 and/or the operating system 708.

In some embodiments, the processor(s) 704 is a central processing unit (CPU), a graphics processing unit (GPU), both CPU and GPU, or other processing unit or component known in the art. Furthermore, the processor(s) 704 may include any number of processors and/or processing cores. The processor(s) 704 is configured to retrieve and execute instructions from the memory 702.

The device 700 may include the modem/RFIC 102 and the RFFE 112 of FIG. 1, as well as associated and/or supporting components.

The device 700 may have a display 712, which may comprise a liquid crystal display or any other type of display commonly used in telomobile devices or other portable devices. For example, the display 712 may be a touch-sensitive display screen, which may also act as an input device or keypad, such as for providing a soft-key keyboard, navigation buttons, or the like.

The device 700 may have input and output devices 714. These devices may include any sort of output devices known in the art, such as a display (already described as display 712), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telomobile device), a multi-key keyboard (such as a conventional QWERTY keyboard), or one or more other types of keys or buttons, and may also include a joystick-like controller and/or designated navigation buttons, or the like.

The device 700 may have various other components that are not shown in FIG. 7.

Although features and/or methodological acts are described above, it is to be understood that the appended claims are not necessarily limited to those features or acts. Rather, the features and acts described above are disclosed as example forms of implementing the claims.

What is claimed is:

1. A radio frequency (RF) front end for use in a cellular communication device, comprising:

a signal splitter to separate a received RF input signal from an antenna to produce a first RF input signal and a second RF input signal in a dual-connectivity mode, wherein the first RF input signal represents first downlink data of a downlink data stream in accordance with a first radio access technology and the second RF input signal represents second downlink data of the downlink data stream in accordance with a second radio access technology;

a first amplifier coupled to a first output of the signal splitter;

a second amplifier coupled to a second output of the signal splitter; and one or more RF switches to selectively send the received RF input signal to the signal splitter in the dual-connectivity mode and to one of the first amplifier or the second amplifier in a non-dual-connectivity mode.

2. The radio frequency front end of claim 1, wherein the first radio access technology comprises a 4th-Generation (4G) radio access technology and the second radio access technology comprises a 5th-Generation (5G) radio access technology.

3. The radio frequency front end of claim 2, wherein the first RF input signal is a Long-Term Evolution (LTE) signal and the second RF input signal is a New Radio (NR) signal.

4. The radio frequency front end of claim 1, wherein:
the first RF input signal is associated with a first frequency;
the second RF input signal is associated with a second frequency; and
the first frequency and the second frequency are within a band of frequencies that are designated for cellular device communications in the dual-connectivity mode.

5. The radio frequency front end of claim 1, wherein the one or more RF switches comprises a first RF switch coupled between the antenna and the signal splitter and a second RF switch coupled between the signal splitter and one of the first amplifier or the second amplifier.

6. The radio frequency front end of claim 1, further comprising a duplexer to connect a composite RF output signal for transmission by the antenna and to provide the received RF input signal to the signal splitter.

7. The radio frequency front end of claim 1, further comprising:
a third amplifier to amplify a first RF output signal to create a first amplified RF output signal, wherein the first RF output signal represents a first portion of an uplink data in accordance with the first radio access technology; and
a fourth amplifier to amplify a second RF output signal to create a second amplified RF output signal, wherein the second RF output signal represents a second portion of the uplink data in accordance with the second radio access technology.

8. A cellular communication device, comprising:
an antenna receiving a composite radio frequency (RF) input signal comprising a first portion of downlink data communicated according to a first radio access technology and a second portion of the downlink data communicated according to a second radio access technology in a dual-connectivity operation;
baseband-RF circuitry converting the first portion of the downlink data and the second portion of the downlink data into an aggregated downlink digital stream, and converting an uplink digital stream into a first RF output signal according to the first radio access technology and a second RF output signal according to the second radio access technology;

a first amplifier amplifying the first RF output signal into a first amplified RF output signal; and a second amplifier separately amplifying the second RF output signal into a second amplified RF output signal.

9. The cellular communication device of claim 8, wherein the first radio access technology comprises a 4th-Generation (4G) radio access technology and the second radio access technology comprises a 5th-Generation (5G) radio access technology.

10. The cellular communication device of claim 8, wherein:
the first RF output signal is associated with a first frequency;
the second RF output signal is associated with a second frequency; and
the first frequency and the second frequency are within a band of frequencies that are designated for the dual-connectivity operation.

11. The cellular communication device of claim 8, further comprising a signal combiner mixing the first amplified RF output signal and the second amplified RF output signal to provide a composite RF output signal for transmission by the antenna in the dual-connectivity operation, wherein the first amplified RF output signal represents first uplink data in accordance with the first radio access technology and the second amplified RF output signal represents second uplink data in accordance with the second radio access technology.

12. The cellular communication device of claim 11, further comprising a duplexer that (a) provides the composite RF output signal for transmission by the antenna and (b) receives the composite RF input signal from the antenna.

13. The cellular communication device of claim 11, further comprising an RF splitter separating the composite RF input signal received by the antenna into a first RF input signal and a second RF input signal, wherein the first RF input signal represents the first portion of the downlink data in accordance with the first radio access technology and the second RF input signal represents the second portion of the downlink data in accordance with the second radio access technology.

14. The cellular communication device of claim 8, further comprising one or more RF switches, between the antenna and an RF splitter, selectively bypassing the RF splitter with the composite RF input signal.

15. A method performed by a cellular communication device, comprising:
receiving a composite radio frequency (RF) input signal comprising a downlink data stream;
splitting the composite RF input signal into (a) a first RF input signal representing a first portion of the downlink data stream in accordance with a first radio access technology and (b) a second RF input signal representing a second portion of the downlink data stream in accordance with a second radio access technology;
converting the first RF input signal and the second RF input signal into an aggregated downlink data stream at baseband;
converting an uplink data stream at baseband into a first RF output signal in accordance with the first radio access technology and a second RF output signal at the second radio access technology; and
separately amplifying the first RF output signal and the second RF output signal to produce a first amplified RF output signal and a second amplified RF output signal.

16. The method of claim 15, wherein:
the first RF input signal is associated with a first frequency;
the second RF input signal is associated with a second frequency; and
the first frequency and the second frequency are within a band of frequencies that are designated for non-stand-alone cellular device communications.

17. The method of claim 15, wherein the first radio access technology comprises a 4th-Generation (4G) radio access technology and the second radio access technology comprises a 5th-Generation (5G) radio access technology.

18. The method of claim 15, wherein the first RF input signal in accordance with the first radio access technology is received from a first base station and the second RF input signal in accordance with the second radio access technology is received from a second base station.

19. The method of claim 15, further comprising combining the first amplified RF output signal and the second amplified RF output signal to create a composite RF output signal.

20. The method of claim 19, further comprising concurrently producing (a) the first RF output signal representing a first portion of the uplink data stream and (b) the second RF output signal representing a second portion of the uplink data stream.

* * * * *